United States Patent [19]

Kosem et al.

[11] Patent Number: 5,068,778
[45] Date of Patent: Nov. 26, 1991

[54] INDUSTRIAL CONTROL SYSTEM DEVICE

[75] Inventors: Marion Kosem, Willoughby Hills; Anthony J. Cachat, Hudson; Thomas D. Toth, Lyndhurst, all of Ohio

[73] Assignee: Reliance Electric Industrial Company, Cleveland, Ohio

[21] Appl. No.: 276,964

[22] Filed: Nov. 28, 1988

[51] Int. Cl.$^5$ .............................................. G05B 15/00
[52] U.S. Cl. ..................................... 364/138; 364/131
[58] Field of Search .............................. 364/130–147, 364/200 MS File, 900 MS File, 468–479, 513

[56] References Cited

U.S. PATENT DOCUMENTS

| | | | |
|---|---|---|---|
| 4,500,951 | 2/1985 | Sugimoto et al. | 364/138 |
| 4,663,704 | 5/1987 | Jones et al. | 364/138 |
| 4,694,396 | 5/1985 | Weisshaar et al. | 364/200 |
| 4,742,443 | 5/1988 | Rohn et al. | 364/136 |
| 4,827,423 | 5/1989 | Beasley et al. | 364/131 |
| 4,831,582 | 5/1989 | Miller et al. | 364/138 |
| 4,853,906 | 8/1989 | Burke | 364/138 |
| 4,858,101 | 8/1989 | Stewart et al. | 364/131 |
| 4,870,590 | 9/1989 | Kawata et al. | 364/131 |
| 4,901,218 | 2/1990 | Cornwell | 364/131 |

Primary Examiner—Jerry Smith
Assistant Examiner—Jim Trammell
Attorney, Agent, or Firm—James A. Hudak

[57] ABSTRACT

An industrial control system device that can be utilized for drive control, process control and/or logic control and which is comprised of a unique combination of hardware and software. Use of one or more of the devices in an industrial control system application permits the control system to be partitioned into subsystems which communicate with one another and which operate as self-contained units. Each subsystem can be further subdivided into modules that have distinct operating functions. The software utilized by the control system device separates the required operating functions of the control system into distinct tasks that operate concurrently (multi-tasking) on a priority level basis while sharing system data and control signals. Three programming languages (BASIC, Control Block, Ladder Logic) are employed so that the most appropriate language can be utilized for each task. Processors can be added to the industrial control system to permit the movement of a task from processor to processor (multiprocessing) without reprogramming.

7 Claims, 4 Drawing Sheets

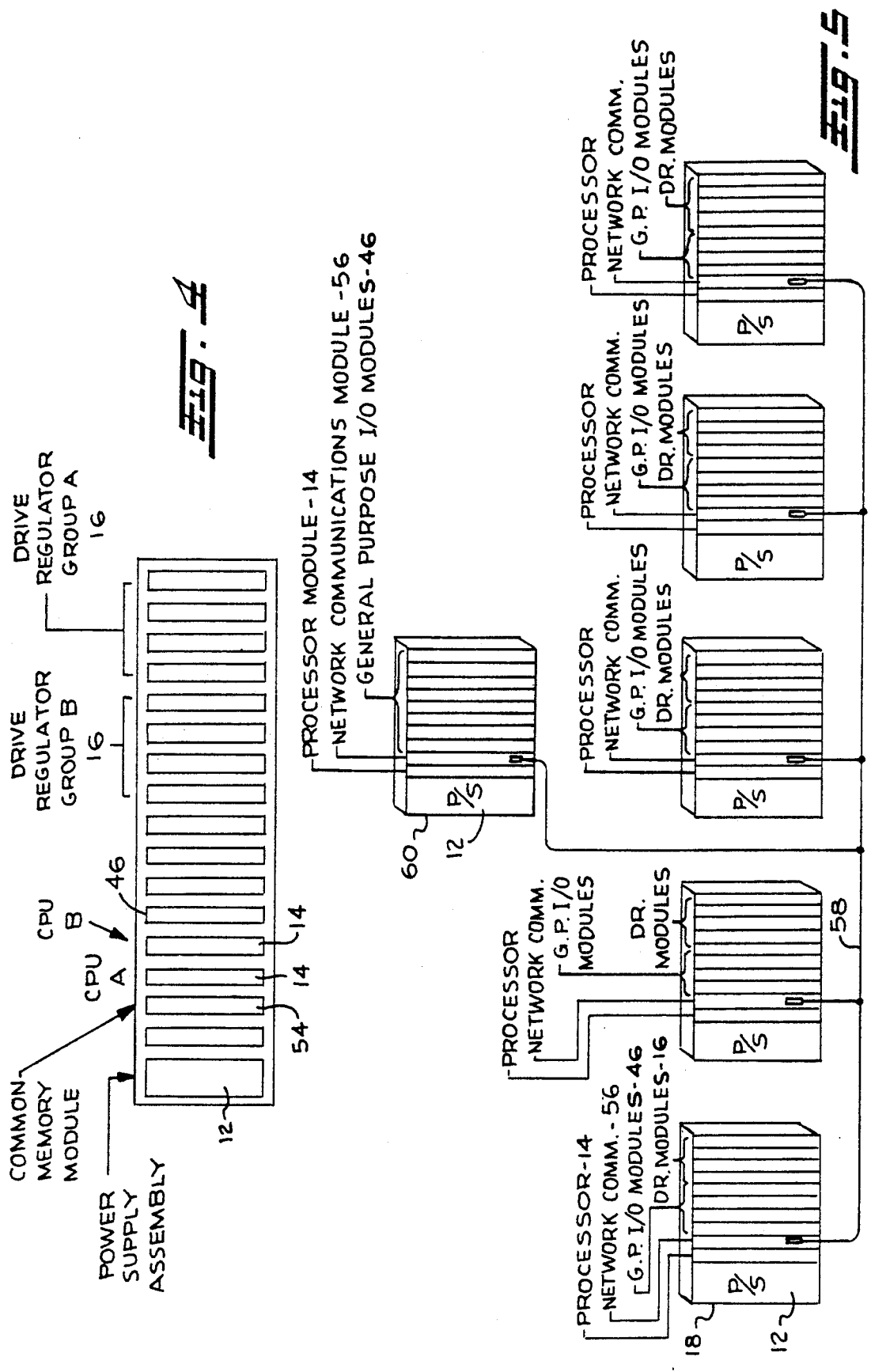

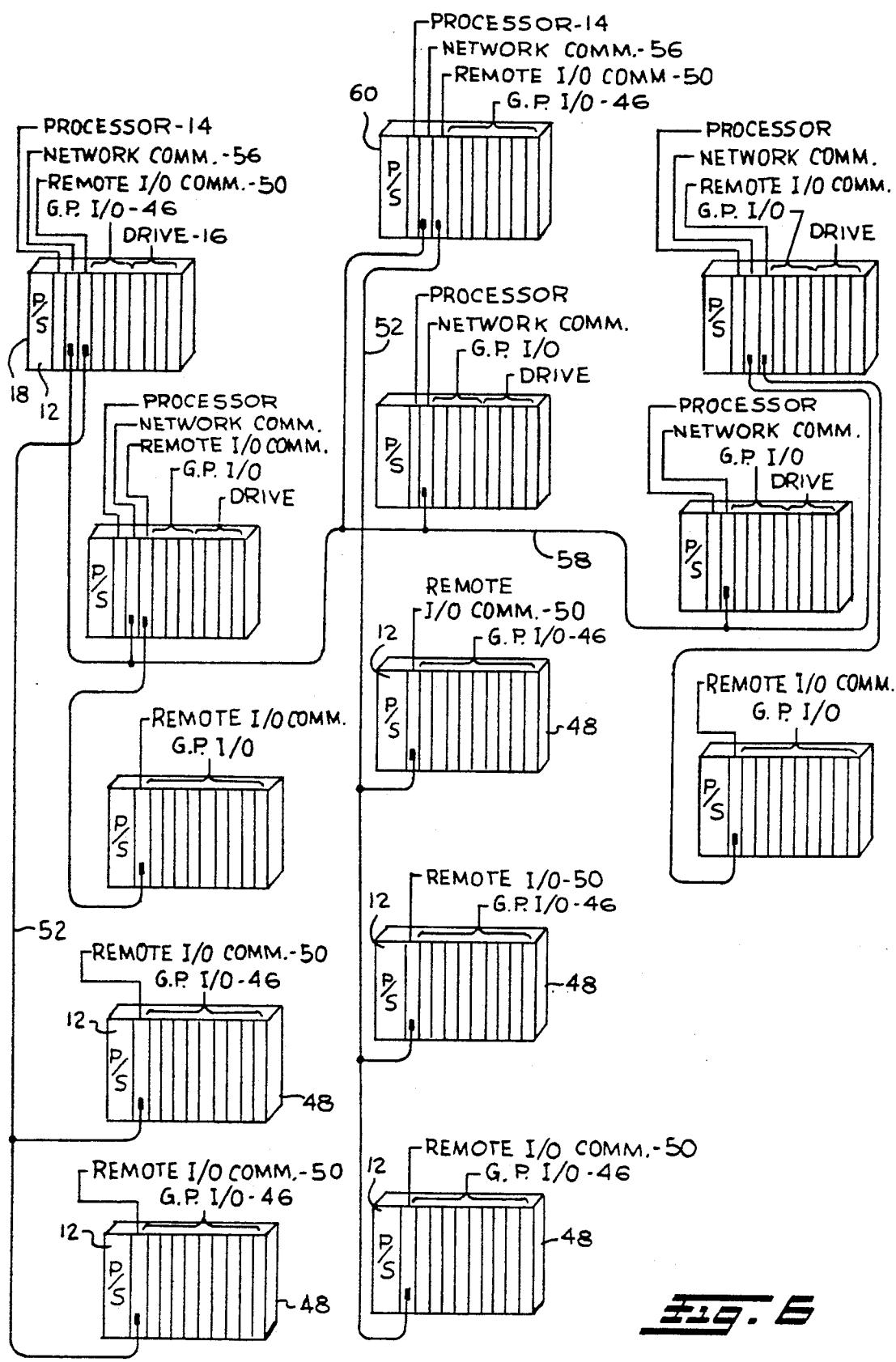

INDUSTRIAL CONTROL SYSTEM DEVICE

TECHNICAL FIELD

The present invention relates generally to a control system device, and more particularly to a control system device that can be utilized in industrial and process control applications.

BACKGROUND ART

One of the major trends in industrial process control is the increasing size and complexity of the systems, both drive and non-drive, being controlled. An example of this is the current popularity of the continuous caster in the steel industry. In this application a relatively simple batch process is replaced by a highly complex and sophisticated system. Similar examples are readily available in other industries. In any case, the resulting systems become unmanageable if considered as a whole entity. Thus, in order to comprehend and manage such complex systems, one must be able to partition the overall system into identifiable subsystems which, in turn, can be partitioned into smaller subsystems until a level is reached that consists of manageable units.

The traditional hardware for implementing large process control systems has generally limited the structuring of the system sections into a hierarchical arrangement. The reporting of system diagnostics or operating data to a host computer, and the execution of computer commands by the sections have proven to be difficult. In addition, traditional hardware cannot be easily modified to adjust for changed system conditions. The foregoing problems were remedied to a certain extent by the introduction of programmable controllers. Programmable controllers can report data to a higher system level, can execute commands from these higher system levels, and can be reprogrammed for changed conditions. The use of programmable controllers, however, creates several problems which are inherent with such controllers. For example, the software associated with a programmable controller is tied specifically to the hardware configuration utilized, making it difficult to reuse the program or portions thereof In addition, the program utilized by the programmable controller must deal with a wide range of problems requiring very different response times. In order to achieve the desired system performance, the programmer must use extensive program branching which makes the software difficult to troubleshoot, maintain, and alter. If program size and/or the input/output count grows beyond the scope of the selected programmable controller, extensive software redesign is usually required in order to move to a larger programmable controller. Furthermore, it has been found that communication to peripherals and complex mathematical operations present difficulty in applications utilizing programmable controllers.

Because of the foregoing, it has become desirable to develop a control system device that can be used in industrial and process control applications, and which can be utilized in a network hierarchical arrangement wherein the control devices can communicate with one another and yet operate as totally independent units.

SUMMARY OF THE INVENTION

The present invention solves the aforementioned problems associated with the prior art as well as other problems by providing a control system device that can be utilized for industrial and process control applications and which is comprised of a unique combination of hardware and software. The hardware is comprised of a multi-function industrial controller capable of real-time distributed control and readily adaptable to small and large industrial and process control applications. By using one or more of the industrial controllers of the present invention, an industrial control system can be partitioned into subsystems which communicate with one another and yet operate as totally self-contained units. Each subsystem is further subdivided into modules that have distinct functions operating in a coordinated manner. The software associated with the industrial controller separates the required functions of the distributed control system into distinct tasks that operate concurrently (multi-tasking) on a priority level basis while sharing system data and control signals. The software further subdivides the tasks into control and sequential operations and utilizes three separate languages (BASIC, Control Block, Ladder Logic) to program same. Additional processors can be readily added to the industrial control system to increase input/output capacity, memory and speed. The addition of such processors permits the movement of a task from processor to processor without reprogramming.

BRIEF DESCRIPTION OF THE DRAWINGS

FIG. 3 is a schematic diagram illustrating the use of remote input/output racks with a drive or process control section rack.

FIG. 4 is a front plan view of a drive or process control section rack showing the placement of multiple drive regulators within the rack.

FIG. 5 is a schematic diagram illustrating the use of multiple drive or process control section racks in a hierarchical network arrangement.

FIG. 6 is a schematic diagram illustrating the use of multiple drive or process control section racks and remote input/output racks in a hierarchical network arrangement.

DESCRIPTION OF THE PREFERRED EMBODIMENT

Figure 1:
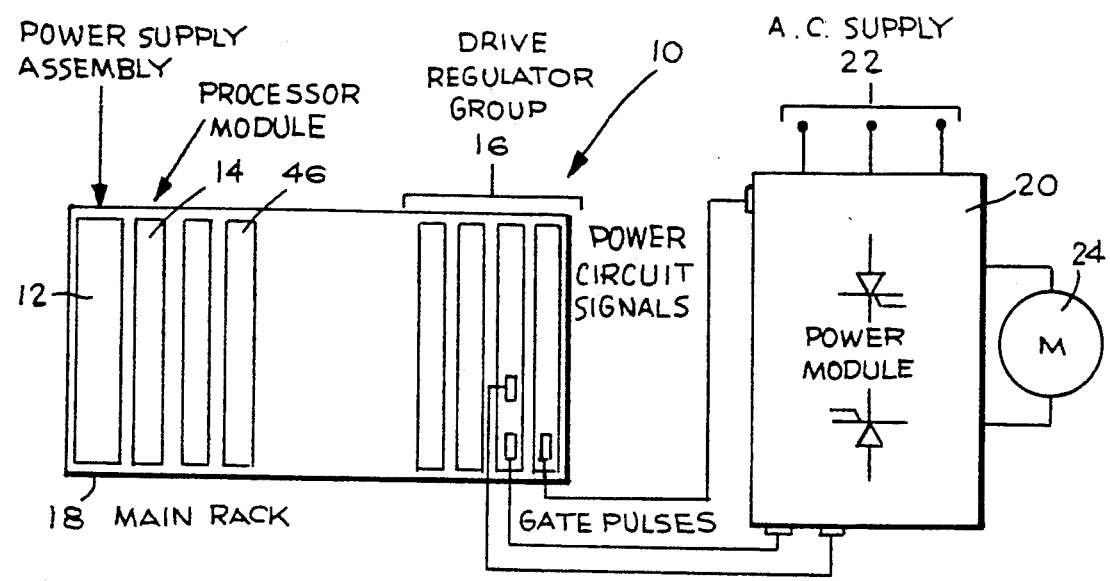
FIG. 1 is a schematic diagram of a typical configuration of the components for a system drive section utilizing the present invention.

Referring now to the drawings where the illustrations are for the purpose of describing the preferred embodiment of the present invention and are not intended to limit the invention hereto, FIG. 1 is a block diagram of a typical configuration 10 of the components for an industrial controller, such as a controller utilized to regulate the operation of a motor drive, embodying the invention of this disclosure. This component configuration 10 includes a power supply module 12, a processor module 14, and a drive regulator group 16 of modules, all contained within a drive or process control section rack 18. The drive regulator group 16 of modules provides gate pulses and power signals to a power module 20 having an AC power supply 22 connected to its input. The output of the power module 20 is connected to a drive motor 24 and controls the operation thereof.

The power supply module 12, the processor module 14 and the drive regulator group 16 of modules are comprised of individual card modules that plug into the drive or process control section rack 18, which is of a steel-type chassis construction. This rack 18 is sized according to the number of card modules required for the motor drive or process to be controlled. The modules within the rack 18 are selectively interconnected by means of one or more buses 26 and 38, shown in FIG. 2, located along the backplane of the rack 18 permitting communication between the modules. The buses 26 and 38 have sockets for interconnection to the module cards.

The power supply module 12 provides all of the voltages necessary to power the logic circuitry of all of the modules contained in the drive or process control section rack 18. The power is transmitted from the power supply module 12 to the other modules within the rack by means of the buses 26 and 38. It should be noted that, in addition to the power supply module 12, a lithium "on board" battery pack (not shown) may be provided to support the random access memory (RAM) for the application program, hereinafter described.

The processor module 14 monitors, directs and coordinates the operation of all the other modules mounted in the rack 18. This module 14 contains a Motorola 68010 microprocessor or the like, which governs the overall operation of the drive or process control section being controlled, and a random access memory (RAM) that stores the operating system which coordinates all of the activities of the microprocessor. The processor module 14 also contains user memory which contains information such as the value of variables and input-/output point status, and contains the application program which the 68010 microprocessor and the operating system execute together. The user memory is configured to the specific requirements of each application, i.e., the drive or process being controlled. All control loops and sequencing for an individual drive or process control section are performed by the processor module 14 for true distributed control.

Figure 2:
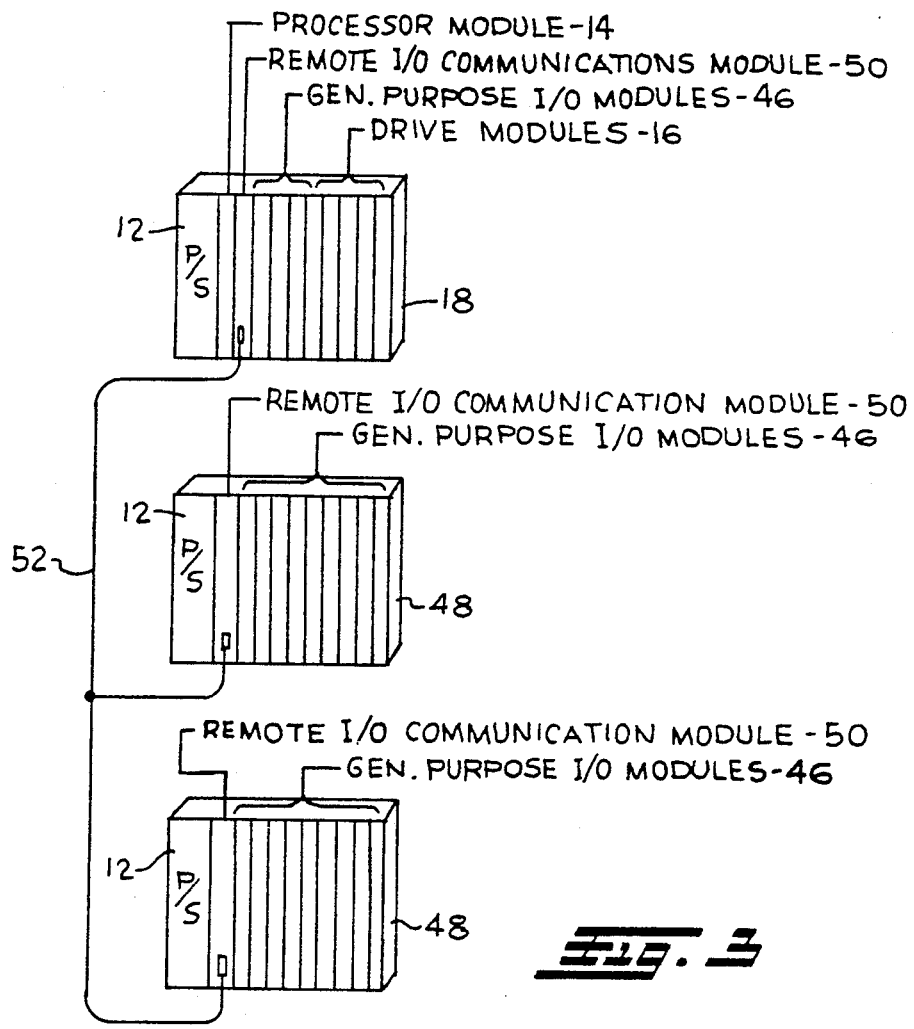
FIG. 2 is a schematic diagram illustrating the interconnection of the components shown in FIG. 1.
Figure 2:
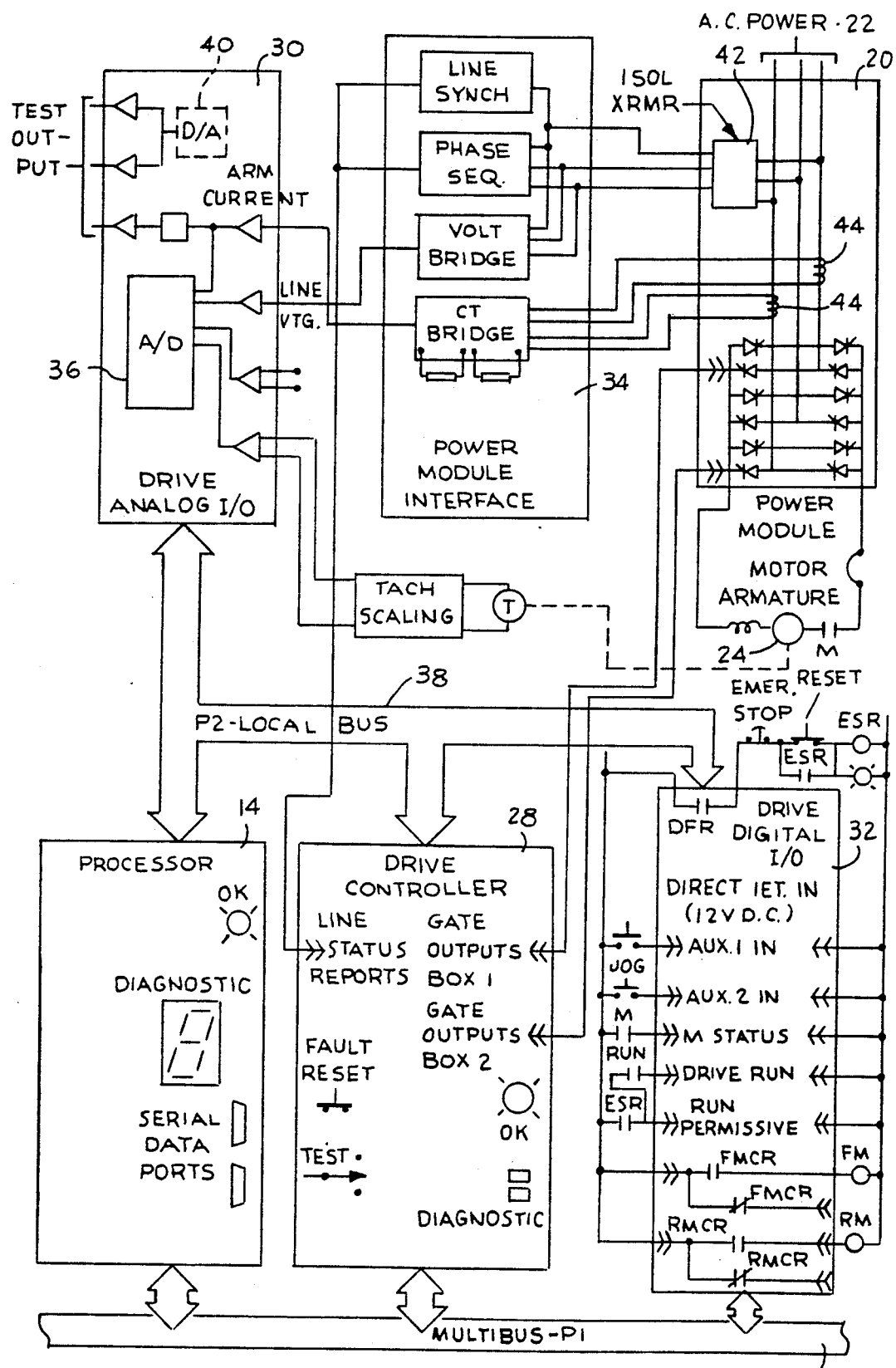

The drive regulator group 16 of the modules provides the interface between the processor module 14 and the power module 20 which controls the power circuits, control circuits, and signal circuitry associated with the motor drive. As such, the drive regulator group 16 of modules is comprised of a drive controller module 28, a drive analog input/output module 30, a drive digital input/output module 32, and a power module interface 34, as shown in FIG. 2. The drive controller module 28 and the drive digital input/output module 32 interface directly with the buses 26 and 38. Similarly, the processor module 14 also interfaces directly with the buses 26 and 38 so that it can regulate the operation of the drive controller module 28.

The drive controller module 28 is a microprocessor based module which acts as the main interface between the processor module 14 and the drive regulator group 16 of modules. As such, this module includes a Z80 microprocessor or the like and local random access memory that can be accessed by either the Z80 microprocessor or the 68010 microprocessor in the processor module 14. The drive controller module 28 controls the drive armature current, as directed by the current minor loop task in the processor module 14. That is, it synchronizes the firing commands with the AC line voltage and generates the gate pulses that fire the SCR's within the power module 20. In addition, the drive controller module 28 controls the drive analog input/output module 30 in substantial synchronism with the AC line. It also allows for the transfer of data from the drive analog input/output module 30 to the processor module 14, and causes a watchdog timeout to initiate an orderly shutdown of the drive if the drive regulator group 16 of modules is not regularly updated by the processor module 14.

With respect to the Z80 microprocessor within the drive controller module 28, this microprocessor performs many functions including detecting the zero crossing time and phase sequence information from the power module interface 34 and placing this information in its local random access memory; directing the drive analog input/output module 30 when to sample instantaneous AC line voltages and currents; reading the optional inputs to the drive analog input/output module 30 and placing reference and feedback signal data into its local random access memory; reading from its local random access memory which SCR's are to fire next and at what instant in time; and setting the timers on the respective SCR firing circuits. The 68010 microprocessor within the processor module 14 also performs many functions including reading the data within the local random access memory associated with the Z80 microprocessor; executing the tasks to be performed by the drive regulator group 16 of modules; and accessing the local random access memory associated with the Z80 microprocessor as to which SCR's fire next and at what instant in time; and power bridge diagnostics.

The drive analog input/output module 30 contains an analog to digital converter 36 which converts analog signals associated with the power module 20 into digital signals for use by the drive regulator program executed by the processor module 14. This module 30 transmits these digital signals to the processor module 14 via the local bus 38 which also interconnects these modules 30, 14 with the drive controller module 28 and the drive digital input/output module 32. In this manner the analog signals representative of speed feedback, speed reference, AC supply line voltage, AC line current and armature currents are converted into digital signals which are then transmitted to the processor module 14. It should be noted that the drive analog input/output module 30 also contains a digital to analog converter 40, which is actually part of the analog to digital converter 36 with appropriate wiring interconnections. This digital to analog converter 40 provides analog outputs which are used for local metering, and/or test functions.

The drive digital input/output module 32 acts as an interface between the drive logic control inputs and outputs and the processor module 14. For example, this module 32 provides an interface for a variety of control signals (RUN or JOG pushbuttons, etc.), inputs from a high speed inverting fault interrupter on a high horsepower regenerative drive, and outputs to a drive fault relay contact. In addition this module 32 provides a run permissive signal that operates the drive forward or reverse contactors.

The power module interface 34 conditions AC power circuit signals for use by the drive analog input/output module 30 and the drive controller module 28. As such, this module produces the phase and line synchronization signals by monitoring the incoming three phase AC power to the power module 20 through an isolation transformer 42 located in the power module 20; it conditions and combines signals from the isolation transformer 42 and current transformers 44 located in the power module 20 to produce the line voltage and armature current feedback signals for use by the drive analog input/output module 30; and it provides for scaling of current signals to accommodate the various ratings of the various power modules 20.

The power module 20 contains the SCR's that control the application of power from the AC power supply 22 to the drive motor 24. This module 20 provides an unlimited range of power capabilities, and both regenerative and nonregenerative modes of operation are available. It should be noted that the hardware associated with the drive regulator group 16 of modules does not change if the horsepower or voltage is changed. The power module 20 provides a full wave S-6 control for smooth, efficient operation of the drive motor 24; provides current limiting AC line fuses sized for short circuit protection of the power SCR's; and input transient over-voltage protection. Even though the embodiment illustrated in the drawings shows a three phase, 6 pulse DC drive application, it is understood that an AC inverter could be substituted for the DC regulator with similar results In addition, this system is readily adaptable to non-drive applications, such as process control or machine logic control.

The drive regulator group 16 of modules may also include a number of optional modules for specific applications For example, this module group 16 may include a field regulator module, a resolver input module, a high speed counter input module, and/or a high performance analog input module (all not shown). These optional modules would be placed within the drive or process control section rack 18 and would be selectively interconnected with the other modules in the rack 18 by the buses 26 and 38.

The drive or process control section rack 18 may also contain one or more general purpose input/output modules 46, as shown in FIG. 1. These modules provide for the input and output of signals from or to external control circuitry or devices. Inputs are monitored and outputs are enabled and disabled as directed by the application program contained in the processor module 14. By way of example, such general purpose input/output modules can include digital input modules where each module receives up to 32 separate inputs from field devices such as pushbuttons or limit switches or can be in the form of digital output modules where each module controls up to 32 output devices such as pilot lamps, solenoids or motor starters. Conversely, these general purpose input/output modules can be of an analog rather than a digital nature and can include analog input modules wherein an analog voltage, from a field device, is converted into a digital value for used by the application program or can be in the form of analog output modules wherein a digital value from the application program is converted into an analog voltage and made available for use external to the system. Whether analog or digital in nature, the address of the input or output signal is determined by its physical location within the system, and it is referred to in the application program by a name assigned to that address in the system configuration program.

In some instances there may be requirements for more general purpose input/output modules 46 than can be accommodated in a drive or process control section rack 18. In such cases, the additional general purpose input/output modules 46 can be placed in a remote input/output rack 48 connected to the drive or process control section rack 18 via a remote input/output communication module 50 provided in both the drive or process control section rack 18 and in the remote input/output rack 48, as shown in FIG. 3. It should be noted that the remote input/output rack 48 is similar to the drive or process control section rack 18 except that the processor module 14 is replaced by the remote input/output communication module 50 and the drive regulator group 16 of modules are replaced by the general purpose input/output modules 46. Up to seven (7) remote input/output racks 48 containing general purpose input/output modules 46 can be connected to a slot in the drive or process control section rack 18 and the interconnection is effected by a single serial communication line 52 which is coupled to a remote input/output communication module 50 located in each remote input/output rack 48 and in the drive or process control section rack 18. The serial communication line 52 may be either a coaxial cable or a twisted pair and can be up to 3000 feet in length. Since a single serial communication line 52 is utilized, hundreds of feet of input/output signal wire are not required and the cost of installing same is not incurred.

From the foregoing, it is apparent that this modular arrangement permits the design of an extremely flexible control system since the number of general purpose input/output modules 46 within a drive or process control section of the system is not limited by the number of available slots in the drive or process control section rack 18, and additional general purpose input/output modules 46 can be received in remote input/output racks 48 connected to the drive or process control section 18. The number of remote input/output communication modules 50 that can be placed in the drive or process control section rack 18 is limited by the number of available slots in this rack 18, however, inasmuch as each remote input/output communication module 50 in this rack 18 can be connected to seven remote input/output racks 48, and each remote rack 48 can accommodate fifteen (15) general purpose input/output modules 46 with thirty two (32) inputs/outputs each, the total number of inputs/outputs that can be controlled is limited only by processing time or system memory capacity.

Although typically only one drive is controlled by each section of the overall system, multiple drive regulators can be accommodated in a single drive or process control section rack 18, as shown in FIG. 4. In this configuration, each drive regulator group 16 of modules is controlled by a separate processor module 14. A common memory module 54 is provided to permit the transfer of data and control signals between the processor modules 14 via the buses 26 and 38 within the rack 18, and also to arbitrate between the processor modules 14 for control of the buses. Such a configuration can be used where there is more than one drive in a machine section or when the memory requirements exceed the capacity of a processor module 14. Thus, the common memory module 54 allows the processor modules 14 to communicate with one another over the buses 26 and 38 and provides bus arbitration signals so that the processor modules 14 can share the buses. It should be noted that the common memory module 54 will support the operation of up to four processor modules 14. In essence, the common memory module 14 permits multiple processor operation (multiprocessing) for the overall control system.

Thus, the communication features of this control system permit the transfer of data and control signals between a plurality of drive regulators within a drive or process control section rack 18 or between a drive regulator and a plurality of remote input/output racks 48. In addition, the process or control sections can be utilized in a network arrangement, as shown in FIG. 5. In this manner, control data and other information can be transferred between two or more drive or process control sections so that the sections operate together as a totally integrated control system. Such processor-to-processor communication makes the control system ideally suited for large industrial manufacturing or process operations, or any application where it is desirable to have two or more process control or drive sections exchange data. As shown in the network arrangement illustrated in FIG. 5, each drive or process control section in the control system has a drive or process control section rack 18 dedicated thereto, and each rack 18 contains a power supply module 12, a processor module 14, a drive regulator group 16 of modules, and general purpose input/output modules 46, as required In addition, a network communication module 56 is included in each drive or process control section rack 18. This network communication module 56 permits communication between up to fifty-five drive or process control section racks 18. Communication between the racks 18 is over a single serial communication line 58 similar to the communication line 52 used for transmission between the remote input/output racks 48 and the drive or process control sections racks 18. The information transferred between the drive or process control sections includes drive or machine control information, such as run or jog signals; drive or machine fault information, such as overspeed, watchdog timeout, etc.; and drive or machine status information and operating data, such as the speed reference or armature current or process reporting information. The communications within the network arrangement is governed by a processor module 14, which acts as a master for the overall arrangement. This processor module 14 is located within a master rack 60 which also contains a power supply module 12, a network communication module 56, and general purpose input/output module 46, as required.

It should be noted that each drive or process control section in the network arrangement may also utilize remote input/output racks 48 to accommodate additional general purpose input/output modules 46, as illustrated in FIG. 6. Thus, as previously described, the overall control system is extremely flexible and the number of inputs/outputs which can be monitored and controlled is limited only by the number of processor modules 14 and system memory capacity. In addition, a peripheral communication module (not shown) can be included in any of the drive or process control section racks 18 to permit a drive or process control section to communicate with a host computer or peripheral devices, such as CRT's and printers (all not shown).

As previously stated, the application program is stored in the processor module 14 and is executed by the 68010 microprocessor and the operating system contained therein. In contrast to hard-wired drives, the foregoing control system uses the application program to control specific operating functions by means of software. Each application program is unique and its contents are determined by the requirements of the individual application. The resulting application programs can be readily modified by the user.

The operating system contained within the processor module 14 permits concurrent execution of multiple programs or "tasks" on the same processor module 14 on a priority basis. Although only one task runs at a time on a processor module, the execution of the tasks is scheduled in such a way that all of the tasks share the processor module over a period of time. This is referred to as "multi-tasking" and permits the overall control scheme to be separated into individual tasks which simplifies the writing, debugging, and maintenance of the application program. Multi-tasking also reduces overall execution time and provides a faster response to critical tasks.

A task as defined in the application program is completely self-contained with its own variable definitions, event definitions, initialization, main procedure body, and subroutines. A typical application program is comprised of a number of separate tasks, each programmed separately and stored into memory separately. Three different programming languages can be used so that the most appropriate language can be utilized for each task. These languages include enhanced "BASIC" language, control block language, and ladder logic language, each of which will be hereinafter described.

The BASIC program language that is utilized is similar to the ANSI standard BASIC programming language, but it is an "enhanced" version required by a real-time multi-tasking industrial control system. This language is used to program the application related operations that are not suited for implementation using control blocks or ladder diagrams. Functions that are readily performed using "enhanced" BASIC language include mathematical operations, comparisons of variables, advanced control algorithms, output of ASCII characters to operator displays, control of communications with a host computer, and system configuration.

Control blocks comprise a programming language which is used primarily for drive control loop or process control tasks. This programming language consists of over forty functions that are commonly used in the design of industrial control systems. Each control block is dedicated to a particular function and performs specific operations on one or more input variables to produce values for one or more output variables. The functions, i.e., the control blocks, are combined to produce complete control loops in a drive regulator or process controller. In this manner, each control loop can be tailored to a specific application by using only the specialized functions needed for the application. The advantages of using control blocks to implement a process loop include:

The control block implementation of a task executes much more quickly than an equivalent task written in BASIC language;

BASIC program statements can be intermixed within the control blocks;

Variables associated with the control loops can be specified as "tunable" and can be incremented or decremented by a specific amount while on-line; and Control block tasks can be easily modified during checkout and start-up of the control system.

The resulting program using control blocks is easily readable since it illustrates signal flow.

The ladder logic programming language is used for tasks which perform sequential logic operations in real-time using the industry standard ladder diagrams. The ladder diagram is a symbolic representation of the logic operations in a format similar to relay logic. The ladder diagram structure is used to define the logic process and establish the sequences and types of operations to be performed. When executed, all inputs and outputs are performed as specified in the ladder diagram.

A "symbolic" or alphanumeric name is assigned by the user to each of the variables in the control system. These names can be meaningful to the user and correspond to the function of the variable. Once defined, the variable is accessible in all three programming languages by referring to it by name. The system configuration task assigns names and physical locations to each of the variables.

As previously stated, the operating system permits real-time concurrent operation of multiple tasks on the same processor module 14. This is accomplished on a priority basis. The system is event driven, i.e., user-defined events such as hardware interrupts, software functions, and real-time clock scheduling can be used to activate tasks. Each task is assigned a unique name, priority level, and update time. The task name is used to reference the task for functions such as editing, monitoring or copying and can be up to eight characters in length. The priority level for a task establishes the priority of execution of the task. Multiple tasks can be assigned the same priority level. The task update time determines how often the task will be executed. A real-time clock on the processor module provides the time base used to update the various tasks. When scheduling an event, the execution of a particular task is based on its priority level and the relative priority levels of the other tasks. At power-up, the real-time operating system will start the task with the highest priority level and continue to execute that task until it relinquishes control. At this point, that task is suspended and the next highest priority level task is executed. Tasks will continue to execute based on priority levels with the possibility of being temporarily suspended at any given time by a higher priority level task. In this manner, concurrent execution of multiple functions or tasks on the same processor module can occur. Although only one task runs at a time on a processor module, the execution of the tasks is scheduled so that all the tasks share the same processor, on a priority level basis, over a period of time. Thus, true "multi-tasking" occurs, and this "multi-tasking" can occur in conjunction with "multi-processing" if multiple processor modules are being utilized.

Multi-tasking provides a number of benefits to the user. An operating system that provides for multi-tasking allows a programmer to break the application program into logical parts (tasks), write separate small programs for each task using the language best suited for the task, schedule how often teach task will run, and assign a priority level to ensure that the most critical tasks happen on time. Since multi-tasking requires that the control problem be broken into manageable parts, the resulting programming is greatly simplified. In addition, the simplified programming allows each task to be run separately, thus, simplifying the debugging of the program. The resulting programs are shorter, and thus, easier to follow than long programs that are filled with multiplicity of branch statements. Lastly, since critical tasks are assigned higher priority levels, the user can be assured that such tasks will be executed when required regardless of the other parts of the application program. If, however, a program exhausts available memory or program execution is too slow, the multi-processing capability of this industrial process control system permits the movement of the task from processor to processor without reprogramming. Thus, it is not necessary to know whether multi-processing will be required when the software is being developed. As previously mentioned, the industrial control system can accommodate four separate processor modules so as to have sufficient multi-processing capability along with the foregoing multi-tasking capability.

Certain modifications and improvements will occur to those skilled in the art upon reading the foregoing. It should be under stood that all such modifications and improvements have been deleted herein for the sake of conciseness and readability, but are properly with the scope of the following claims.

We claim:

1. An industrial control system device comprising a central processing unit, a system operating program contained within said central processing unit, and an application program comprising a plurality of tasks contained within said central processing unit, each of said tasks being implemented by one of a plurality of programming languages, said programming languages utilizing a symbolic name for each system variable permitting the variables to be accessible by each of said tasks, said application program being executed by said central processing unit and said operating program directing the concurrent execution of a plurality of said tasks by said central processing unit on a priority basis.

2. The control system device as defined in claim 1 wherein said programming languages comprise realtime BASIC, control blocks and ladder-type logic.

3. The control system device as defined in claim 1 further including input-output devices and at least one common bus, said input-output devices having access to said central processing unit via said at least one common bus.

4. The control system device as defined in claim 1 wherein said central processing unit comprises a microprocessor, a random access memory, and a user memory, all operatively interconnected.

5. The control system device as defined in claim 4 wherein said user memory contains instructions required for the operation of the control system device and said symbolic name for each system variable.

6. The control system device as defined in claim 4 wherein said random access memory contains instructions for directing the operation of said microprocessor.

7. An industrial control system comprising two or more control system devices each including a central processing unit, a system operating program contained within said central processing unit, an application program comprising a plurality of tasks contained within said central processing unit, each of said tasks being implemented by a programming language, said programming language utilizing a symbolic name for each system variable permitting the variables to be accessible by each of said tasks, said application program being executed by said central processing unit and said operating program directing the concurrent execution of a plurality of said tasks by said central processing unit on a priority basis, a master controller, and at least one intercommunication bus operatively interconnecting said control system devices, said master controller regulating the communication of information between control system devices on said at least one intercommunication bus and coordinating the transfer of tasks between said control system devices.

* * * * *